US008972732B2

(12) United States Patent
Kotla et al.

(10) Patent No.: US 8,972,732 B2
(45) Date of Patent: Mar. 3, 2015

(54) OFFLINE DATA ACCESS USING TRUSTED HARDWARE

(71) Applicant: Microsoft Corporation, Redmond, WA (US)

(72) Inventors: Ramakrishna R. Kotla, Sunnyvale, CA (US); Thomas L. Rodeheffer, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 13/711,643

(22) Filed: Dec. 12, 2012

(65) Prior Publication Data
US 2014/0164773 A1    Jun. 12, 2014

(51) Int. Cl.
*H04L 9/32*    (2006.01)
*G06F 21/10*   (2013.01)
*G06F 21/57*   (2013.01)
*H04L 9/08*    (2006.01)

(52) U.S. Cl.
CPC .............. *G06F 21/10* (2013.01); *H04L 9/0816* (2013.01); *H04L 9/0822* (2013.01); *H04L 9/0866* (2013.01); *H04L 2209/127* (2013.01); *H04L 2209/60* (2013.01); *G06F 21/57* (2013.01)
USPC ........................................................ 713/171

(58) Field of Classification Search
CPC ............... H04L 9/0822; H04L 9/0816; H04L 2209/127; H04L 2209/60; H04L 9/0866; H04L 9/0861; G06F 21/10; G06F 21/27
See application file for complete search history.

(56) References Cited

U.S. PATENT DOCUMENTS

| 5,671,279 | A   | * | 9/1997  | Elgamal ......................... 705/79  |
| 6,115,735 | A   | * | 9/2000  | Saito ............................. 709/200 |
| 6,601,088 | B1  | * | 7/2003  | Kelley et al. .................. 709/206 |
| 7,095,859 | B2  | * | 8/2006  | Challener ...................... 380/282 |
| 7,921,292 | B1  | * | 4/2011  | Pauker et al. ................. 713/171 |
| 7,930,757 | B2  |   | 4/2011  | Shapiro et al. |
| 8,010,688 | B2  | * | 8/2011  | Onoda et al. .................. 709/230 |
| 8,037,110 | B2  |   | 10/2011 | Salgado et al. |
| 8,144,874 | B2  | * | 3/2012  | McGough ...................... 380/277 |

(Continued)

OTHER PUBLICATIONS

Dijk, et al., "Offline Untrusted Storage with Immediate Detection of Forking and Replay Attacks", Retrieved at <<http://people.csail.mit.edu/devadas/pubs/ccs-stc07.pdf>>, STC'07, Nov. 2, 2007, pp. 8.

(Continued)

*Primary Examiner* — Krisna Lim
(74) *Attorney, Agent, or Firm* — Julie Kane Akhter; Danielle Johnston-Holmes; Micky Minhas

(57) ABSTRACT

A cryptographically-secure component provides access-undeniability and verifiable revocation for clients with respect to downloaded content items from a server. A cryptographically-secure component is implemented in a client. When the client wants to purchase and download a content item from the server, the server requests an encryption key from the client. The client generates an encryption key that is bound to a state of the client that is associated with decrypting the content item. The server encrypts the content item using the encryption key and sends the encrypted content item to the client. Because the encryption key used to encrypt the content item is bound to the state associated with the client decrypting the content item, if the client desires to view the content item the client may first advance its state to the bound state to retrieve the decryption key.

20 Claims, 6 Drawing Sheets

(56) References Cited

U.S. PATENT DOCUMENTS

| | | | |
|---|---|---|---|
| 2002/0035681 A1* | 3/2002 | Maturana et al. | 713/151 |
| 2008/0320299 A1* | 12/2008 | Wobber et al. | 713/156 |
| 2011/0106906 A1 | 5/2011 | Assouad | |
| 2012/0198235 A1 | 8/2012 | Kotla et al. | |

OTHER PUBLICATIONS

Rodeheffer, et al., "Inserting Intentional Bugs for Model Checking Assurance", Retrieved at <<http://tla2012.loria.fr/contributed/rodeheffer-kotla.pdf>>, International Workshop on the TLA+ Method and Tools, Aug. 27, 2012, pp. 100.

Catuogno, et al., "Transparent Mobile Storage Protection in Trusted Virtual Domains", Retrieved at <<http://static.usenix.org/event/lisa09/tech/full_papers/catuogno.pdf>>, 23rd conference on Large installation system administration, Nov. 1, 2009, pp. 14.

Anciaux, et al., "A Hardware Approach for Trusted Access and Usage Control", Retrieved at <<http://www-smis.inria.fr/~bouganim/Publis/BOUGA_B3_HADNBOOK_2009.pdf>>, Published in Handbook of Research on Secure Multimedia Distribution, Shiguo Lian (Ed.) (2008), 2008, pp. 24.

Costan, Victor, Marius, "A Commodity Trusted Computing Module", Retrieved at <<http://people.csail.mit.edu/palay/T-Party%2OREPORT%202_09/FINAL/THESES/7_Costan_thesis_2008.pdf>>, May 2008, pp. 106.

Am, D., "AMD64 Virtualization: Secure Virtual Machine Architecture Reference Manual", Retrieved at <<http://www.mimuw.edu.pl/~ vincent/lecture6/sources/amd-pacifica-specification.pdf>>, In Technical report, Advanced Micro Devices, May 2005, pp. 124.

Belaramani, et al., "PRACTI Replication", Retrieved at <<http://people.cs.umass.edu/~arun/papers/PRACTI.pdf>>, In Proceedings of the 3rd Conference on Networked Systems Design & Implementation, vol. 3, May 8, 2008, pp. 14.

Berger, et al., "vTPM: Virtualizing the Trusted Platform Module", Retrieved at <<http://static.usenix.org/event/sec06/tech/full_papers/berger/berger.pdf>>, In Proceedings of the 15th Conference on USENIX Security Symposium, vol. 15, Jul. 31, 2006, pp. 16.

"BitLocker Drive Encryption Overview", Retrieved at <<http://windows.microsoft.com/en-US/windows-vista/BitLocker-Drive-Encryption-Overview>>, Retrieved Date: Sep. 26, 2012, pp. 2.

Chaudhuri, et al., "Verifying Safety Properties with the TLA+ Proof System", Retrieved at <<http://kaustuv.chaudhuri.info/papers/ijcar10tla.pdf>>, In Proceedings of the 5th International Joint Conference on Automated Reasoning, Jul. 16, 2010, pp. 7.

Chun, et al., "Attested Append-Only Memory: Making Adversaries Stick to their Word", Retrieved at <<http://iris.csail.mit.edu/irisbib/papers/aaom:sosp21/paper.pdf>>, In Proceedings of the 21st ACM Symposium on Operating Systems Principles, Oct. 14, 2007, pp. 16.

Hoeven, Arie Van Der, "Delivering a Secure and Fast Boot Experience with UEFI", Retrieved at <<http://channel9.msdn.com/events/BUILD/BUILD2011/HW-457T>>, Sep. 14, 2011, pp. 5.

Dunn, et al., "Cloaking Malware with the Trusted Platform Module", Retrieved at <<http://www.cs.utexas.edu/~adunn/pubs/malware-tpm.pdf>>, In Proceedings of the 20th USENIX Conference on Security, Aug. 8, 2011, pp. 16.

Garfinkel, et al., "Terra: A VM-Based Platform for Trusted Computing", Retrieved at <<http://suif.stanford.edu/papers/sosp03-terra.pdf>>, In Proceedings of the Nineteenth ACM Symposium on Operating Systems Principles, Oct. 19, 2003, pp. 14.

Geambasu, et al., "Keypad: An Auditing File System for Theft-Prone Devices", Retrieved at <<http://eurosys2011.cs.uni-salzburg.at/pdf/eurosys2011-geambasu.pdf>>, In Proceedings of the Sixth Conference on Computer Systems, Apr. 10, 2011, pp. 15.

O'Reilly, Dennis., "Gmail Delivery Errors Divulge Confidential Information", Retrieved at <<http://news.cnet.com/8301-13880_3-10438580-68.html>>, Jan. 21, 2010, Pages.

Gummadi, et al., "Not-a-Bot: Improving Service Availability in the Face of Botnet Attacks", Retrieved at <<http://pages.cs.wisc.edu/~akella/CS838/F09/838-Papers/gamechangers.pdf>>, In Proceedings of the 6th USENIX Symposium on Networked Systems Design and Implementation, Apr. 22, 2009, pp. 14.

Haeberlen, et al., "PeerReview: Practical Accountability for Distributed Systems", Retrieved at <<http://www.sosp2007.org/papers/sosp118-haeberlen.pdf>>, In Proceedings of the 21st ACM Symposium on Operating Systems Principles, Oct. 14, 2007, pp. 14.

Halderman, et al., "Lest We Remember: Cold Boot Attacks on Encryption Keys", In Proceedings of the 17th USENIX Security Symposium, Jul. 28, 2008, pp. 16.

"Health Information Technology for Economic and Clinical Health Act", Retrieved at <<http://en.wikipedia.org/wiki/HITECH_Act>>, Retrieved Date: Sep. 26, 2012, pp. 7.

Ho, et al., "NYSIAD: Practical Protocol Transformation to Tolerate Byzantine Failures", Retrieved at <<http://www.cs.cornell.edu/home/rvr/papers/nysiad.pdf>>, In Proceedings of the 5th USENIX Symposium on Networked Systems Design and Implementation, Apr. 16, 2008, pp. 14.

Dissent, "Hospital Fined Over Privacy Breaches in Days after Deaths of Jackson, Fawcett", Retrieved at http://www.phiprivacy.net/?p=2888>>, Jun. 10, 2010, pp. 2.

"LaGrande Technology Preliminary Architecture Specification", Retrieved at <<http://www.ptlsim.org/papers/LaGrande-LT_spec_0906.pdf>>, Sep. 2006, pp. 82.

Dissent, "Johns Hopkins University E-Mail Attachment Error Exposed Personal Info", Retrieved at <<http://www.phiprivacy.net/?p=4583>>, Oct. 22, 2010, pp. 3.

Kistler, et al., "Disconnected Operation in the Coda File System", Retrieved at <<http://grids.ucs.indiana.edu/ptliupages/hhms/pdf/disconnected.pdf>>, In Journal of ACM Transactions on Computer Systems, vol. 10, Issue 1, Feb. 1992, pp. 23.

Klein, et al., "seL4: Formal Verification of an OS Kernel", Retrieved at <<http://www.sigops.org/sosp/sosp09/papers/klein-sosp09.pdf>>, In Proceedings of the ACM SIGOPS 22nd Symposium on Operating Systems Principles, Oct. 11, 2009, pp. 18.

Krohn, et al., "Information Flow Control for Standard OS Abstractions", Retrieved at <<http://pdos.csail.mit.edu/papers/flume-sosp07.pdf>>, In Proceedings of Twenty-First ACM SIGOPS Symposium on Operating Systems Principles, Oct. 14, 2007, pp. 14.

Levin, et al., "TRINC: Small Trusted Hardware for Large Distributed Systems", Retrieved at <<http://citeseerx.ist.psu.edu/viewdoc/download;jsessionid=55940593E56DC2993E4B26285F10A775?doi=10.1.1.148.808&rep=rep1&type=pdf>>, In Proceedings of the 6th USENIX Symposium on Networked Systems Design and Implementation, Apr. 22, 2009, pp. 14.

Li, et al., "Secure Untrusted Data Repository (SUNDR)", Retrieved at <<http://static.usenix.org/event/osdi04/tech/full_papers/li_j/li_j.pdf>>, In Proceedings of the 6th Conference on Symposium on Operating Systems Design & Implementation, vol. 6, Dec. 6, 2004, pp. 16.

Lie, et al., "Implementing an Untrusted Operating System on Trusted Hardware", Retrieved at <<http://static.usenix.org/event/osdi04/tech/full_papers/li_j/li_j.pdf>>, In Proceedings of the Nineteenth ACM Symposium on Operating Systems Principles, Oct. 19, 2003, pp. 15.

Mahajan, et al., "Depot: Cloud Storage with Minimal Trust", Retrieved at <<http://nms.csail.mit.edu/sys-security/clouddepot.pdf>>, In Proceedings of the 9th USENIX Conference on Operating Systems Design and Implementation, Oct. 4, 2010, pp. 26.

Maheshwari, et al., "How to Build a Trusted Database System on Untrusted Storage", Retrieved at <<http://static.usenix.org/event/osdi00/full_papers/maheshwari/maheshwari.pdf>>, In Proceedings of the 4th Conference on Symposium on Operating System Design & Implementation, vol. 4, Oct. 23, 2000, pp. 16.

McCune, et al., "TrustVisor: Efficient TCB Reduction and Attestation", Retrieved at <<http://www.cs.washington.edu/research/projects/poirot3/Oakland/sp/PAPERS/2010/021.pdf>>, In Proceedings of the IEEE Symposium on Security and Privacy, May 16, 2010, pp. 16.

McCuney, et al., "Flicker: An Execution Infrastructure for TCB Minimization", Retrieved at <<http://users.ece.cmu.edu/~jmmccune/papers/mccune_parno_perrig_reiter_isozaki_eurosys08.pdf>>, In Proceedings of the 3rd ACM SIGOPS/EuroSys European Conference on Computer Systems, Apr. 1, 2008, pp. 14.

(56) References Cited

OTHER PUBLICATIONS

Menezes, et al., "Handbook of Applied Cryptography", Retrieved at <<http://reference.kfupm.edu.sa/content/h/a/handbook_of_applied_cryptography_10889.pdf>>, In Handbook of Applied Cryptography, Oct. 1996, pp. 794.

"Microsoft Outlook 2012", Retrieved at <<http://office.microsoft.com/en-us/outlook/>>, Retrieved Date: Sep. 28, 2012, p. 1.

Parno, et al., "Memoir: Practical State Continuity for Protected Modules", Retrieved at <<http://130.203.133.150/viewdoc/download;jsessionid=38D0A7263C498145179FE627A1D433BB?doi=10.1.1.206.5025&rep=rep1&type=pdf>>, In IEEE Symposium on Security and Privacy, May 2011, pp. 16.

Perrig, et al., "SAM: A Flexible and Secure Auction Architecture using Trusted Hardware", Retrieved at <<http://citeseerx.ist.psu.edu/viewdoc/download;jsessionid=4DF93D46F722E965D2903D3EBBC4771A?doi=10.1.1.21.5534&rep=rep1&type=pdf>>, In Proceedings of 15th International Parallel and Distributed Processing Symposium, Apr. 30, 1991, pp. 10.

Ramasubramanian, et al., "Cimbiosys: A Platform for Content-based Partial Replication", Retrieved at <<http://citeseerx.ist.psu.edu/viewdoc/download?doi=10.1.1.146.4476&rep=rep1&type=pdf>>, In Proceedings of the 6th ACM/USENIX Symposium on Networked Systems Design and Implementation, Apr. 22, 2009, pp. 14.

Rodeheffer, et al., "Pasture Node State Specification", Retrieved at <<http://research.microsoft.com/pubs/171575/paper.pdf>>, In Technical Report MSR-TR-2012-84, Aug. 17, 2012, pp. 183.

Sarmenta, et al., "Virtual Monotonic Counters and Count-limited Objects using a TPM without a Trusted OS", Retrieved at <<http://citeseerx.ist.psu.edu/viewdoc/download;jsessionid=276E688510EBD76323268D9999E710D8?doi=10.1.1.135.8086&rep=rep1&type=pdf>>, In Proceedings of ACM Workshop on Scalable Trusted Computing, Nov. 3, 2006, pp. 15.

Schneider, et al., "Nexus Authorization Logic (NAL): Design Rationale and Applications", Retrieved at <<http://www.cs.cornell.edu/People/egs/papers/nal.pdf>>, In Journal of ACM Transactions on Information and System Security, vol. 14, Issue 1, May 2011, pp. 30.

Shieh, et al., "NetQuery: A Knowledge Plane for Reasoning about Network Properties", Retrieved at <<http://www.cs.cornell.edu/fbs/publications/netQuery.SIGCOM2011.pdf>>, In Proceedings of ACM SIGCOMM, Aug. 15, 2011, pp. 12.

Singaravelu, et al., "Reducing TCB Complexity for Security-sensitive Applications: Three Case Studies", Retrieved at <<http://citeseerx.ist.psu.edu/viewdoc/download?doi=10.1.1.67.7229&rep=rep1&type=pdf>>, In Proceedings of the ACM European Conference in Computer Systems, Apr. 18, 2006, pp. 14.

Sirer, et al., "Logical Attestation: An Authorization Architecture for Trustworthy Computing", Retrieved at <<http://piki.org/patrick/nexus.pdf>>, In Proceedings of the Twenty-Third ACM Symposium on Operating Systems Principles, Oct. 23, 2011, pp. 16.

Smith, et al., "Security and Privacy for Partial Order Time", Retrieved at <<http://reference.kfupm.edu.sa/content/s/e/security_and_privacy_for_partial_order_t_229984.pdf>>, In Proceedings of the ISCA International Conference on Parallel and Distributed Computing Systems, Apr. 1994, pp. 23.

Suh, et al., "Design and Implementation of the AEGIS Single-chip Secure Processor Using Physical Random Functions", Retrieved at <<http://pages.cs.wisc.edu/~isca2005/papers/01-03.PDF>>, In Proceedings of the 32nd Annual International Symposium on Computer Architecture, vol. 33, Issue 2, Jun. 4, 2005, pp. 12.

"Summary of the HIPPA Security Rule", Retrieved at <<http://www.hhs.gov/ocr/privacy/hipaa/understanding/srsummary.html>>, Retrieved Date: Sep. 27, 2012, p. 1.

Ta-Min, et al., "Splitting Interfaces: Making Trust between Applications and Operating Systems Configurable", Retrieved at <<http://www.eecg.toronto.edu/~lie/papers/Proxos-OSDI2006-web.pdf>>, In Proceedings of the 7th Symposium on Operating Systems Design and Implementation, Oct. 31, 2006, pp. 14.

Terry, et al., "Managing Update Conflicts in Bayou, a Weakly Connected Replicated Storage System", Retrieved at <<http://zoo.cs.yale.edu/classes/cs422/2011/bib/terry95managing.pdf>>, In Proceedings of the Fifteenth ACM Symposium on Operating Systems Principles, Dec. 1995, pp. 12.

"TPM Main Specification", Retrieved at <<http://www.trustedcomputinggroup.org/resources/tpm_main_specification>>, Retrieved Date: Sep. 28, 2012, pp. 2.

Vandebogart, et al., "Labels and Event Processes in the Asbestos Operating System", Retrieved at <<http://www.scs.stanford.edu/~dm/home/papers/vandebogart:asbestos-tocs.pdf>>, In Proceedings of ACM Transactions on Computer Systems, vol. 25, Issue 4, Dec. 2007, pp. 43.

Yee, et al., "Secure Coprocessors in Electronic Commerce Applications", Retrieved at <<http://www.cs.berkeley.edu/~tygar/papers/Secure_coprocessors_in_e-comm.pdf>>, In Proceedings of the 1st USENIX Workshop on Electronic Commerce, Jul. 1995, pp. 16.

Yumerefendi, et al., "Strong Accountability for Network Storage", Retrieved at <<http://www.cs.duke.edu/nicl/pub/papers/cats-fast07.pdf>>, In Journal of ACM Transactions on Storage, vol. 3, Issue 3, Oct. 2007, pp. 16.

Zeldovich, et al., "Making Information Flow Explicit in HiStar", Retrieved at <<http://www.scs.stanford.edu/~nickolai/papers/zeldovich-histar.pdf>>, In Proceedings of the 7th Symposium on Operating Systems Design and Implementation, vol. 7, Nov. 2006, pp. 16.

Zhang, et al., "CloudVisor: Retrofitting Protection of Virtual Machines in Multi-tenant Cloud with Nested Virtualization", Retrieved at http://www.sigops.org/sosp/sosp11/current/2011-Cascais/printable/15-zhang.pdf>>, In Proceedings of the Twenty-Third ACM Symposium on Operating Systems Principles, Oct. 23, 2011, pp. 14.

Zhou, et al., "Building Verifiable Trusted Path on Commodity x86 Computers", Retrieved at <<http://users.ece.cmu.edu/~jmmccune/papers/ZhGlNeMc2012.pdf>>, In Proceedings of the IEEE Symposium on Security and Privacy, May 2012, pp. 15.

\* cited by examiner

OFFLINE DATA ACCESS USING TRUSTED HARDWARE

BACKGROUND

Mobile experiences are enriched by applications that support offline data access. Decentralized databases, file systems, storage systems, and email applications support disconnected operation to provide better mobility and availability. With the increasing use of mobile devices, such as laptops, tablets, and smart phones, a use should have access to data despite being offline.

However, support for such offline operation is at odds with security when the user is not trusted. An offline untrusted user (in full control of the user device) could perform arbitrary actions on whatever data was available and subsequently lie about it. This tension between mobility and security limits the use of disconnected operation in many potentially useful scenarios.

SUMMARY

A cryptographically-secure component is used to provide access-undeniability and verifiable revocation for clients with respect to downloaded content items from a content item server even where the clients access the downloaded content items while offline. A cryptographically-secure component is implemented in a client of the content item server. When the client wants to purchase and download a content item (e.g., a movie) from the content item server, the server requests an encryption key from the client. The cryptographically-secure component of the client generates an encryption key that is bound to a state of the client that is associated with decrypting the content item. The server encrypts the content item using the encryption key and sends the encrypted content item to the client. Because the encryption key used to encrypt the content item is bound to the state associated with the client decrypting the content item, if the client wants to decrypt and view the content item, the client may advance its state to the bound state in the cryptographically-secure component to retrieve the decryption key. Alternatively, if the receiving client wants to delete the content item without viewing it, the client may advance its state to a deletion state associated with the encrypted content item, after which the decryption key will no longer be available. The client may then request a refund for the purchased content item from the server.

In an implementation, a request for a content item is received at a content item server from a client device. A request for an encryption key is sent from the content item server to the client device. The encryption key is received by the content item server from the client device. The encryption key is bound to a state associated with the client device accessing a decryption key corresponding to the encryption key. It is verified by the content item server that the state that the encryption key is bound to is the state associated with the client device accessing the corresponding decryption key. If the state that the encryption key is bound to is the state associated with the client device accessing the corresponding decryption key, the requested content item is encrypted using the encryption key, and the encrypted content item is sent to the client device.

In an implementation, a content item is requested by a client device from a content item server. A request for an encryption key is received from the content item server by the client device. An encryption key is generated by the client device. The encryption key is generated by a cryptographically-secure component of the client device and is bound to a state associated with accessing a decryption key corresponding to the encryption key. The generated encryption key is sent to the content item server by the client device. An encrypted content item is received by the client device from the content item server. The encrypted content item was encrypted by the content item server using the encryption key.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
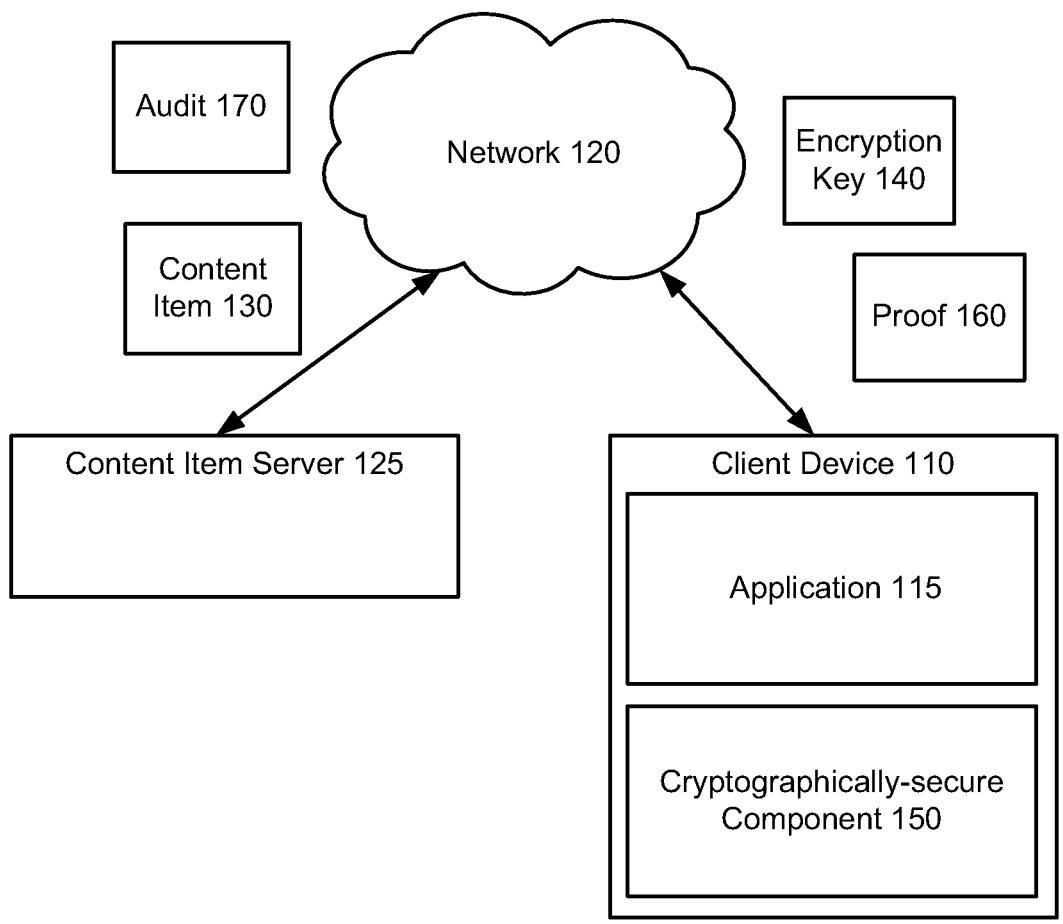
FIG. 1 is an illustration of an example environment for providing access-undeniability and verifiable revocation with respect to content items.

FIG. 1 is an illustration of an example environment 100 for providing access-undeniability and verifiable revocation with respect to content items. As illustrated, the environment 100 includes a client device 110 and a content item server 125 in communication with each other through a network 120. The network 120 may be a variety of network types including the public switched telephone network (PSTN), a cellular telephone network, and a packet switched network (e.g., the Internet). The content item server 125 and the client device 110 may be implemented using one or more general purpose computing devices such as the computing device 600 described with respect to FIG. 6, for example. Moreover, while only one client device 110 and one content item server 125 is shown in FIG. 1, it is for illustrative purposes only; there is no limit to the number of client devices 110 and/or content item servers 125 that may be supported.

The content item server 125 may store and provide content items 130 to client devices 110 through the network 120. The content items 130 may include a variety of content item types including but not limited to video data (e.g., movies and television shows), audio data (e.g., albums, singles, podcasts, etc.), text data (e.g., e-books), and software. Other types of content items 130 may include public and private records such as medical or financial data, for example. The client device 110 may access and/or utilize the content items 130 using one or more applications 115 such as media players, for example. The content items 130 may be provided to the client devices 110 in an encrypted form using one or more encryption keys 140.

The content item server 125 may provide access-undeniability and verifiable revocation to the client device 110 with respect to content items 130 through a cryptographically secure component 150 of the client device 110. Access-undeniability may ensure that a client device 110 cannot download a content item 130 from the content item server 125, view or access the content item 130 when in an offline state (e.g., when disconnected from the content item server 125, the network 120, or the Internet), and then later claim to have not viewed or accessed the content item 130.

Verifiable revocation may ensure that the client device 110 can prove to the content item server 125 that the client device 110 has revoked access to a content item 130, and that the client device 110 cannot later access or view the content item 130. For example, if the client device 110 downloads a content item 130 from the content item server 125, but then later decides not to view the content item 130, the client device 110 can permanently revoke access to the content item 130, and the content item server 125 is assured that the client device 110 has not, and never will, access or view the content item 130, even where the client device 110 has been in an offline state.

In some implementations, the cryptographically-secure component 150 of the client device 110 may help provide the access-undeniability and verifiable revocation by generating what is referred to herein as a proof 160. The content item server 125 may request a proof 160 from a client device 110 in what is referred to herein as an audit 170. The content item server 125 may send the audit 170 to client devices 110 periodically, when a client device 110 moves from an offline state to an online state, or at the request of the client device 110.

In response to the audit 170, the cryptographically-secure component 150 of the client device 110 may generate the proof 160 and send the generated proof 160 to the content item server 125. The content item server 125 may determine if the client device 110 used or viewed any downloaded content items 130 when in the offline state, or if the client device 110 revoked access to any of the downloaded content items 130 without accessing or viewing them. Example methods and techniques used by the cryptographically-secure component 150 to generate such proofs 160 are described further below with respect to FIG. 2, for example.

As can be appreciated, such audits 170 and proofs 160 provide many applications with respect to the offline access of content items 130. One such example is an offline system for video or e-book rental. The content item server 125 may provide video or e-book content items 130 to a client device 110 while the client device 110 is in an online state, and may then charge the client device 110 for the downloaded content items 130. While the client device 110 is in an offline state, the client device 110 may view some of the downloaded content items, and may decide to never view the other downloaded content items. When the client device 110 returns to the online state, the content server 125 may audit the client device 110 and may give the client device 110 a refund for the content items that were not viewed. In another implementation, the client device 110 may only be charged after a content item is used or viewed.

Figure 2:
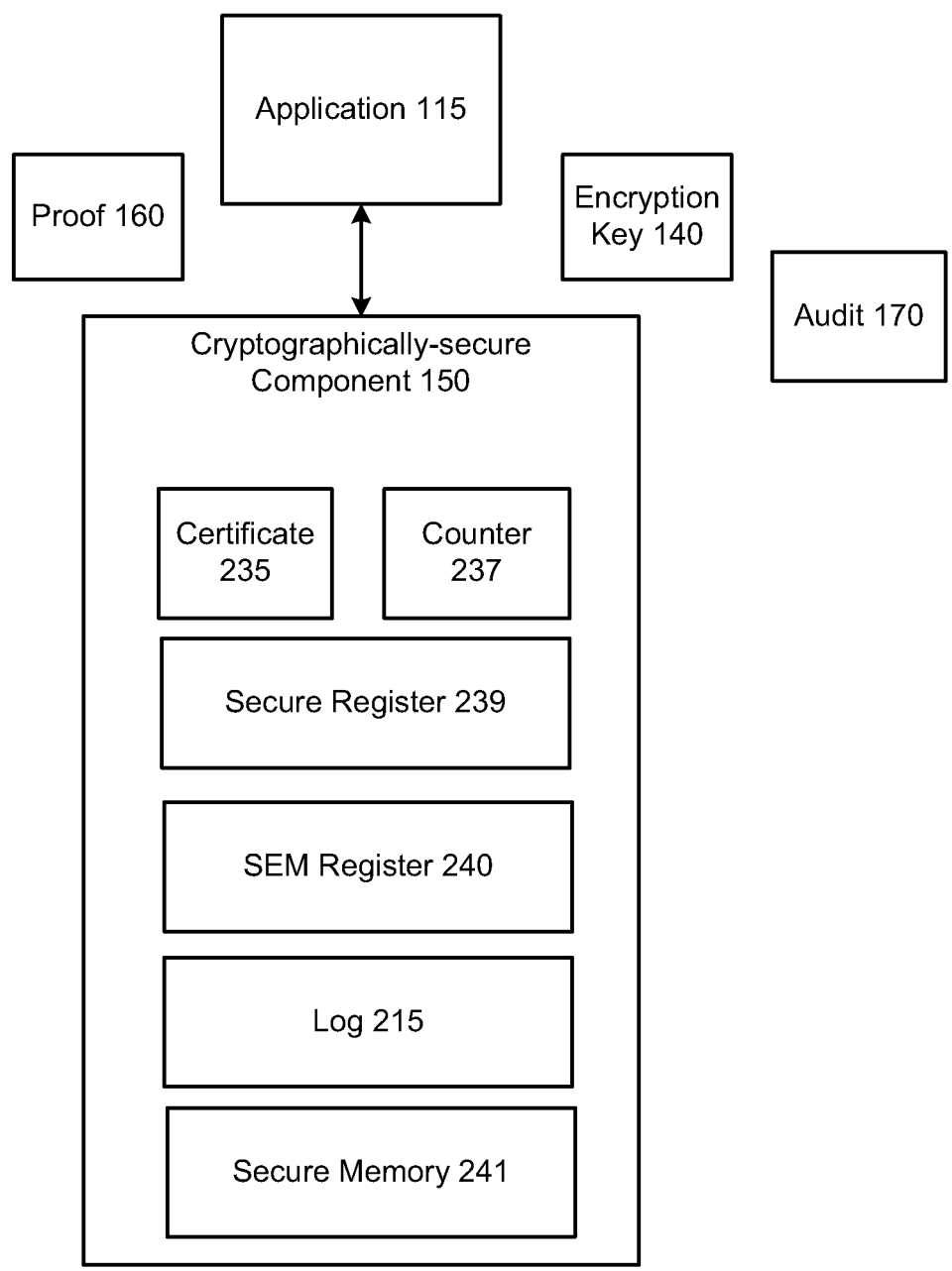
FIG. 2 is a block diagram of an implementation of an example cryptographically-secure component.

FIG. 2 is a block diagram of an implementation of an example cryptographically-secure component 150. The cryptographically-secure component 150 may be a tamper-resistant component in that the contents of the component may not be changeable without using specific methods and/or functions provided by the cryptographically-secure component 150 to an application 115. The cryptographically-secure component 150 may be a hardware component, but it is contemplated that some or all of the aspects of the cryptographically-secure component 150 may be implemented using software, or some combination of software and hardware. In some implementations, the cryptographically-secure component 150 may be a trusted platform module. The trusted platform module may comprise a standard secure co-processor that is found in many computing systems. Other systems and methods for providing a cryptographically-secure component 150 may also be used.

In some implementations, the cryptographically-secure component 150 may include a certificate 235. The certificate 235 may be a cryptographic certificate and may be unique to each cryptographically-secure component 150. In some implementations, the certificate 235 is provided by a certifying authority and "burnt" into hardware associated with the cryptographically-secure component 150. The certificate 235 may not be spoofed and therefore ensures that a message or other data signed using the certificate 235 originates from the particular cryptographically-secure component 150 associated with the certificate 235.

For example, the cryptographically-secure component 150 of the client device 110 may sign each message or request for a content item 130 generated by the application 115 using the certificate 235, and the signed messages and/or requests may be transmitted to the content item server 125. To verify that the message or request is indeed from the client device 110, the content item server 125 may retrieve the public key associated with the client device 110 and may decrypt the signature associated with the message and/or request.

In some implementations, the cryptographically-secure component 150 may further be able to generate additional keys and/or certificates and sign results, state digests of the cryptographically-secure component 150, and other data. These keys may be related to or based on the certificate 235, allowing the keys to be validated by the content item server 125 using a public key associated with the certificate 235 as described above, for example.

The cryptographically-secure component 150 may further include one or more secure registers 239. The secure register 239 may be a register that is adapted to store a state digest that describes a succession of states of the application 115. In some implementations, the state digest may be a chained digest such as an SHA1 digest, for example. The state digest may be signed using the certificate 235, or some other certificate or key generated from the certificate 235. The secure register 239 may be a platform configuration register of the trusted platform module, for example.

In some implementations, the secure register 239 may comprise a register that can be updated using a specialized cryptographically-secure operation of the cryptographically-secure component 150. The operation is referred to herein as an extend operation. The extend operation when performed with an identifier of a content item 130 "H" replaces the contents of the secure register 239 with the concatenation of the contents of the secure register 239 with the identifier of the content item 130. For example, where the secure register 239 is a platform configuration register with a current state digest of $PCR_T$, the extend operation on the secure register 239 replaces $PCR_T$ with $PCR_{T+1}$ that is equal to $SHA1(PCR_T\|H)$. In some implementations, the identifier of the content item 130 may be a hash of the content item 130. Other identifiers may also be supported.

The cryptographically-secure component 150 may further include a counter 237. The counter 237 may be a secure counter and may be implemented using a non-volatile monotonic hardware counter, for example. In some implementations, the counter 237 may be used to keep a count of the number of successful reboots. The cryptographically-secure component 150 may increment the counter 237 to prevent attacks involving multiple shutdowns without a successful recovery in between. While only one counter 237 is shown, there is no limit to the number of counters that may be supported by the cryptographically-secure component 150.

The secure register 239 may include a state digest that is a concatenation of previous states of the application 115. Because the amount of memory available to the secure register 239 is finite, in some implementations, the state digest stored by secure register 239 may be a summary of the states of the application 115, or may only include the most recent states of the application 115. Accordingly, a complete log of the states of the application 115 may be stored in a log 215 of the cryptographically-secure component 150. For example, the cryptographically-secure component 150 may append each state that the application 115 and/or client device 110 enters to the log 215. In some implementations, the log 215 may be stored unencrypted in untrusted memory. If a malicious software application or adversarial node makes a change to a value of the log 215, the state digest stored in the secure register 239 may be used by the cryptographically-secure component 150 to detect the change and potentially reverse the change.

The cryptographically-secure component 150 may further include a secure execution mode ("SEM") register 240. The SEM register 240 is a specialized secure register that is used by the cryptographically-secure component 150 during SEM. When the client device 110 starts or reboots, the cryptographically-secure component 150 disables interrupts and other cores to prevent non-trusted software from accessing trusted code and taking control of the client device 110. The cryptographically-secure component 150 may then reset and extend the SEM register 240 with a SHA1 hash of the trusted code (i.e., the application 115), and may then begin execution of the trusted code. Because the value of the SEM register 240 after a reset of the register is different than the value of the SEM register 240 after a reboot (i.e., the SHA1 of the trusted code), the value of the SEM register 240 may be used to restrict access to secrets to the trusted code using bound encryption keys. The trusted code may extend the SEM register 240 to a good value that signifies a correct recovery from a reboot.

In some implementations, the cryptographically-secure component 150 may be adapted to generate at least one encryption key 140 that is bound to a selected state of the secure register 239 and a good value of the SEM register 240 using a bind operation. The encryption key 140 may be generated from the certificate 235, and a content item 130 encrypted using such an encryption key 140 may only be decrypted by a cryptographically-secure component 150 when its secure register 239 has a state that is equal to the selected state and its SEM register 240 has a good value. The bind operation may be used by the cryptographically-secure component 150 to provide access-undeniability to a content item 130 by binding the encryption key 140 to a state digest associated with using or viewing the content item 130. The encrypted content item 130 may then not be subsequently decrypted by a client device 110 until the cryptographically-secure component 150 updates its state in the secure register 239 to the state digests associated with using or viewing the content item 130 using the extend operation.

For example, the application 115 of the client device 110 may request a content item 130 for viewing in an offline state from the content item server 125. Before sending the content item 130, the content item server 125 may request an encryption key 140 from the client device 110. The request may include an identifier of the requested content item 130 such as a hash. The application 115 and/or client device 110 may request an encryption key 140 from the cryptographically-secure component 150 that is bound to a state that is associated with viewing or using the identified content item 130. The cryptographically-secure component 150 may generate an encryption key 140 that is bound to the state using the current state digest from the secure register 239, the good value in the SEM register 240, and the certificate 235 using the bind operation. The client device 110 may provide the encryption key 140 to the content server 125. The content server 125 may encrypt the requested content item 130 using the encryption key 140 before sending the content item 130 to the client device 110.

Because the encryption key 140 is bound to the state associated with using or viewing the content item 130, the application 115 of the client device 110 may not be able to retrieve the decryption key that corresponds to the encryption key 140 without changing its state in the secure register 239 to the bound state using the extend operation. Thus, when the client device 110 is in an offline state and determines to view the content item 130, it may have to change its state to the bound state associated with using or viewing the content item 130 in order to access the decryption key. If a subsequent audit 170 is received by the client device 110 from the content item server 125 when the client device 110 returns to an online state, the client device 110 will not be able to deny having had access to the decryption key and is therefore assumed to also have used or viewed the content item 130. Depending on the implementation, the client device 110 may then be charged for the content item 130 by the content item server 125, for example.

The bind operation may similarly be used by the cryptographically-secure component 150 to provide verifiable revocation to each content item 130. As described above, a received content item 130 may not be subsequently decrypted and accessed or viewed by a client device 110 until the cryptographically-secure component 150 updates its state in the secure register 239 to the state digest associated with accessing or viewing the content item 130 using the extend operation. Accordingly, if during an offline state the client device 110 determines to not use or view the content item 130 (i.e., delete the content item 130 without accessing it, or revoking access to the content item 130), the client device 110 may update its state in the secure register 239 to a state that is different from the bound state using the extend operation. For example, the state may be updated to a deletion state or a revocation state. The counter 237 may not be used as part of the bind operation to provide verifiable revocation to each content item 130.

Because the state in the secure register 239 is not the bound state, the client device 110 cannot enter the bound state and the corresponding decryption keys are no longer available from the cryptographically-secure component 150. Thus, the application 115 can no longer use or view the encrypted content item 130 even if the content item 130 remains stored at the client device 110.

One difficulty faced by the above described solution is dealing with reboots of the client device 110 while the client device 110 is in the offline state. The decryption keys associated with each content item 130 are each bound to a particular state of the secure register 239 and the good value in the SEM register 240. Rebooting a client device 110 causes the secure register 239 and the SEM register 240 to reset to a default state, which may potentially allow a malicious offline user to deny having viewed or used one or more content items 130 by rebooting their client device 110.

In some implementations, the cryptographically-secure component 150 may prevent such attacks by, upon detecting an imminent reboot or shutdown, entering SEM. While in SEM, the cryptographically-secure component 150 may write the state digest of the secure register 239 to a secure memory 241. The secure memory 241 may be non-volatile and may be accessible only to the cryptographically-secure component 150 while in SEM.

When the client device 110 reboots, or recovers from the shutdown state, the cryptographically-secure component 150 may enter SEM again and may retrieve the recorded state digest from the secure memory 241. The cryptographically-secure component 150 may then extend the secure register 239 using each sequence in the log 215. The value of the secure register 239 may be compared with the state digest that was retrieved from the secure memory 241. If they match, then the reboot was not associated with any malicious actions. If they do not match, then the reboot may have been malicious.

In some implementations, the cryptographically-secure component 150 may further store two fields, e.g. R and Current, in the secure memory 241. The field R may be used to store the state digest, and the field Current may be a flag that indicates whether the state digest in R is current. Before a reboot, during SEM the value of the state digest from the secure register 239 is written to R by the cryptographically-secure component 150, and the field Current is set to true. After the reboot, again during SEM, when the cryptographically-secure component 150 verifies that the value of the secure register 239 matches the value stored in R, Current is set to false and the SEM register 240 is extended to match the good value. If after any reboot, the value of Current is still true or the SEM register 240 does not contain the good value, then the reboot recovery procedures described above were unsuccessful, and the cryptographically-secure component 150 may presume that a reboot was malicious. In addition, the cryptographically-secure component 150 may increment the counter 237 to prevent attacks involving multiple shutdowns without a successful recovery in between. As described above, the counter 237 may be used to count the number of successful reboots.

The cryptographically-secure component 150 may be adapted to respond to one or more audits 170 received from the content item server 125. The audits 170 may be used by the content item server 125 to determine, for example, which content items 135 were used or viewed while a client device 110 was in an offline state, or which content items 135 were revoked or not viewed by the client device 110. The content item server 125 may periodically send audits 170 to the client devices 110, may sent an audit 170 to a client device 110 after the client device 110 goes from an offline state to an online state, or when requested by the client device 110, depending on the implementation. For example, a client device 110 may request a refund for a content item 130 that it revoked access to or deleted without watching.

The cryptographically-secure component 150 may be further adapted to respond to an audit 170 by generating at least one proof 160. In some implementations, a proof 160 may comprise a state digest such as the state digest stored in the secure register 239. In addition, the proof 160 may include a copy of the log 215 and/or the signed contents of the SEM register 240. The proof 160 may be provided by a client device 110 as proof of which content items 130 the application 115 viewed or used (or at least had access to the corresponding decryption key), and which content items 130 the application 115 either deleted or revoked access to. The proof 160 may be signed or encrypted using the certificate 235 of the cryptographically-secure component 150 as evidence that the proof 160 was generated by the cryptographically-secure component 150.

The content item server 125 may determine actions to take based on the proof 160. In implementations where the client device 110 is charged for each content item 130 that is downloaded, the content item server 125 may determine, based on the proof 160, which content items 130 that the application 115 of the client device 110 either deleted or revoked access to. The client device 110 may then be refunded an amount of funds for each determined content item 130. In implementations where the client device 110 is only charged for the content items 130 that were viewed, the content item server 125 may determine which content items 130 were viewed or used, and may charge the client device 110 an amount of funds for each determined content item 130.

Figure 3:
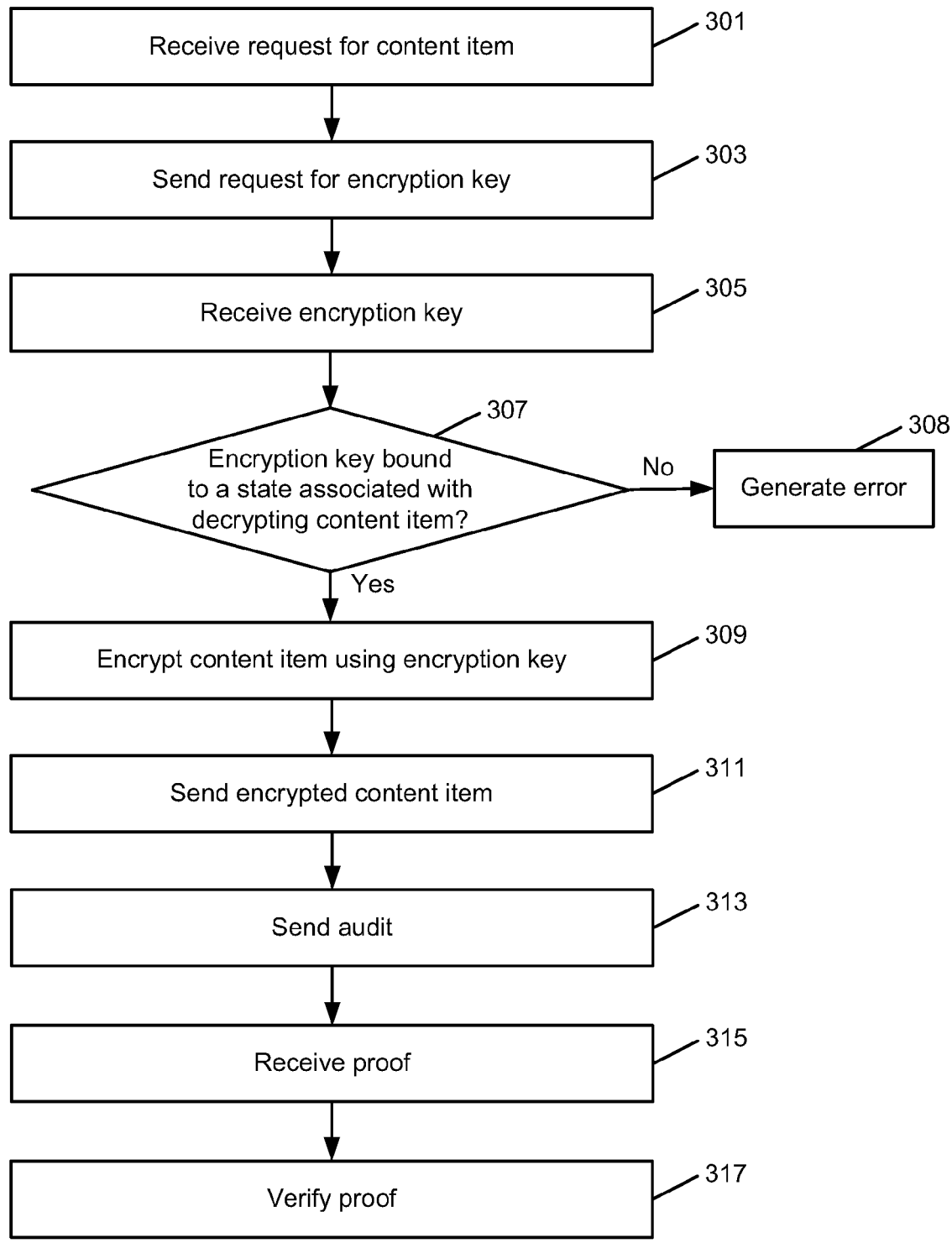
FIG. 3 is an operational flow of an implementation of a method for sending an encrypted content item.

FIG. 3 is an operational flow of an implementation of a method 300 for sending an encrypted content item. The method 300 may be implemented by one or both of a client device 110 and/or a content item server 125, for example.

A request for a content item is received at 301. The request may be a request for a content item 130 stored and/or maintained by the content item server 125. The request may be generated by a client device 110. For example, an application 115 of the client device 110 may be used to peruse a database of content items 130 (such as movies, e-books, videogames, etc.) that are available from the content item server 125. The application 115 may select a content item 130 to download, and may send a request for the content item 130 to the server 125.

A request for an encryption key is sent at 303. The request may be sent by the content item server 125 to the client device 110 in response to the request for the content item 130. In some implementations, the request may include an identifier of the content item 130 that was requested. For example, the identifier may comprise a hash of the content item 130.

An encryption key is received at 305. The encryption key 140 may be received by the server 125 from the client device 110. In some implementations, the encryption key 140 may have been generated by the cryptographically-secure component 150 of the client device 110 using a certificate 235. The generated encryption key 140 may be bound to a state associated with the client device accessing a decryption key that corresponds to the encryption key 140.

A determination is made as to whether the encryption key is bound to a state associated with having access to the decryption key at 307. Because the client device 110 cannot use or view a version of the content item 130 that is encrypted with the key 140 without access to the corresponding decryption key, in some implementations the client device 110 and/or the application 115 may be deemed to have used or viewed the content item 130 when they have access to the decryption key. The determination may be made by the server using a proof-of-attestation included with the encryption key 140, for example. The proof-of-attestation may include evidence that the encryption key 140 was bound to the correct selected state of the secure register 239 and the good value of the SEM register 240. The encryption key may be bound to the selected state without reference to the counter 237.

If the content-item server 125 determines that the encryption key 140 is bound to the state associated with having access to the decryption key, then the method 300 may proceed to 309. Otherwise, at 308, an error may be generated by the content server 125 and the requested content item 130 may not be provided to the client device 110.

The content item is encrypted using the encryption key at 309. The content item 130 may be encrypted by the content item server 125 using the received encryption key 140.

The encrypted content item is sent at 311. The encrypted content item 130 may be sent by the content item server 125 to the client device 110 through the network 120. In some implementations, the client device 110 and/or the application 115 may be charged a fee for the content item 130.

If the client device 110 enters an offline state and desires to read the encrypted content item 130, the application 115 may instruct the cryptographically-secure component 150 to use the extend operation to advance its state stored in the secure register 239 to the state bound to the encryption key 140 to receive access to the decryption key. The decryption key may be used to decrypt and use or view the content item 130. If the application 115 desires to revoke access to the decryption key (and therefore never be able to decrypt the content item 130), the application 115 may instruct the cryptographically-secure component 150 to use the extend operation to advance its state stored in the secure register 239 to a different state. Because the state in the secure register 239 is not the state associated with having access to the decryption key for the content item 130, the encrypted content item 130 can no longer be used or viewed by the application 115.

An audit is sent to the client device at 313. The audit 170 may be sent to the client device 110 from the client server 125 because the client device has moved from an offline state to an online state, or the client device 110 may want a refund for the content item 130. For example, the client device 110 may have either viewed the content item 130 while offline, or may have revoked access to the content item.

A proof is received at 315. The proof 160 may be received by the content item server 125 from the client device 110. The proof 160 may include the log 215, the signed state digest from the secure register 239, and the signed contents of the SEM register 240 of the client device 110.

The proof is verified at 317. The proof 160 may be verified by the content item server 125 by determining whether the contents of the log 215 are reflected by the signed state digest. The content item server 125 may also determine from the log 215 if the content item 130 was used or viewed by the application 115, or if the application 115 revoked access to the content item 130. Depending on the implementation, the content item server 125 may refund the client device 110 for the revoked access, or may charge the client device 110 for using or viewing the content item 130 while offline.

Figure 4:
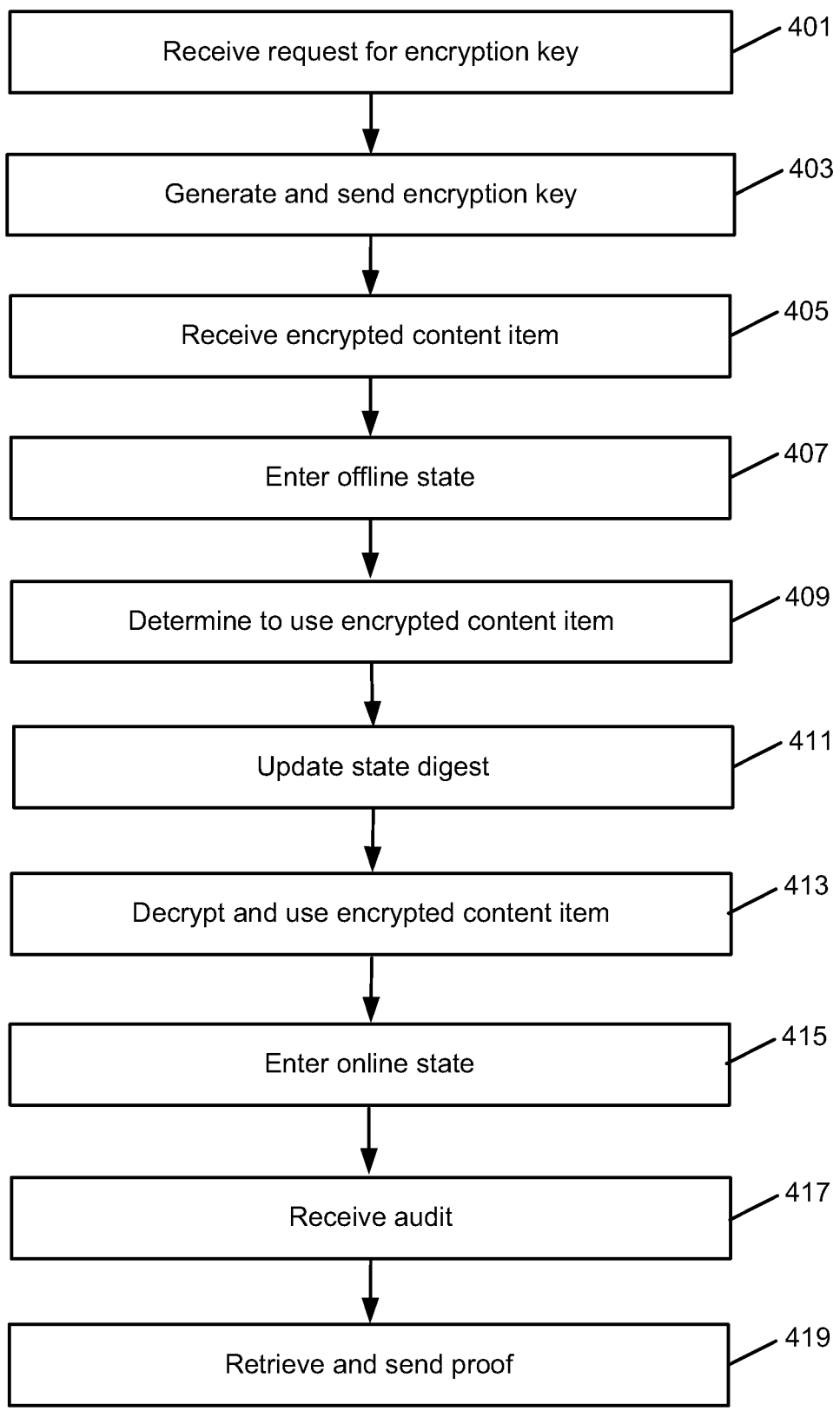
FIG. 4 is an operational flow of an implementation of a method for receiving a content item and responding to an audit.

FIG. 4 is an operational flow of an implementation of a method 400 for receiving a content item 130 and responding to an audit. The method 400 may be implemented by the client device 110, for example.

A request for an encryption key is received at 401. The request may be received by a client device 110 from a content item server 125 through the network 120. The request may include an identifier of a content item 130 that the content item server 125 intends to send to the client device 110. The content item 130 may have been initially requested by the client device 110 from the content item server 125.

An encryption key is generated and sent at 403. The encryption key 140 may be generated by a cryptographically-secure component 150 of the client device 110 and sent by the application 115 to the content item server 125 through the network 120.

An encrypted content item is received at 405. The encrypted content item 130 may be received by the application 115 of the client device 110 from the content item server 125 through the network 120. The content item 130 may have been encrypted by the content item server 125 using the encryption key 140.

An offline state is entered at 407. The client device 110 may enter the offline state by disconnecting from the network 120 and/or the internet, for example.

A determination is made to use the encrypted content item at 409. The determination may be made by a user of the application 115 of the client device 110. For example, when the encrypted content item 130 was received, the content item 130 may have been stored on the client device 110 for later use or viewing. The user may determine to use or view the content item 130 by clicking, or otherwise selecting, the content item 130.

The state is updated at 411. The state may be the state of the application 115 and may be updated to reflect the use of the received content item 130 by the cryptographically-secure component 150. In some implementations, the state may be updated by the cryptographically-secure component 150 using an extend operation. The extend operation may update the state digest stored in the secure register 239. In addition, the state may be appended to the log 215.

The encrypted content item is decrypted and used at 413. The content item 130 may be decrypted by the application 115 of the client device 110. After the state was updated, the application 115 may request access to a corresponding decryption key from the secure component 150 to decrypt the encrypted content item 130. Because the encryption key 140 that was used to encrypt the content item 130 was bound to the state associated with using or viewing the content item 130, the secure component 150 may grant access to the corresponding decryption key to the application 115. The application 115 may decrypt the encrypted content item 130 using the corresponding decryption key.

An online state is entered at 415. The client device 110 may go online by reconnecting to the network 120 and/or the internet, for example.

An audit is received at 417. The audit 170 may be received by the application 115 of the client device 110 from the content item server 125. The content item server 125 may have sent the audit 170 when it detected that the client device 110 had returned online.

A proof is retrieved and sent at 419. The requested proof 160 may be sent by the application 115 of the client device 110 to the content item server 125 in response to the audit 170. The application 115 may retrieve the proof 160 from the cryptographically-secure component 150. In some implementations, the proof 160 may comprise a signed state digest, the log 215, and the signed contents of the SEM register 240. The content item server 125 may use the proof 160 to determine that the application 115 used or viewed the content item 130 while offline. Depending on the implementation, the content item sever 125 may charge the client device 110 a fee for using or viewing the content item 130.

Figure 5:
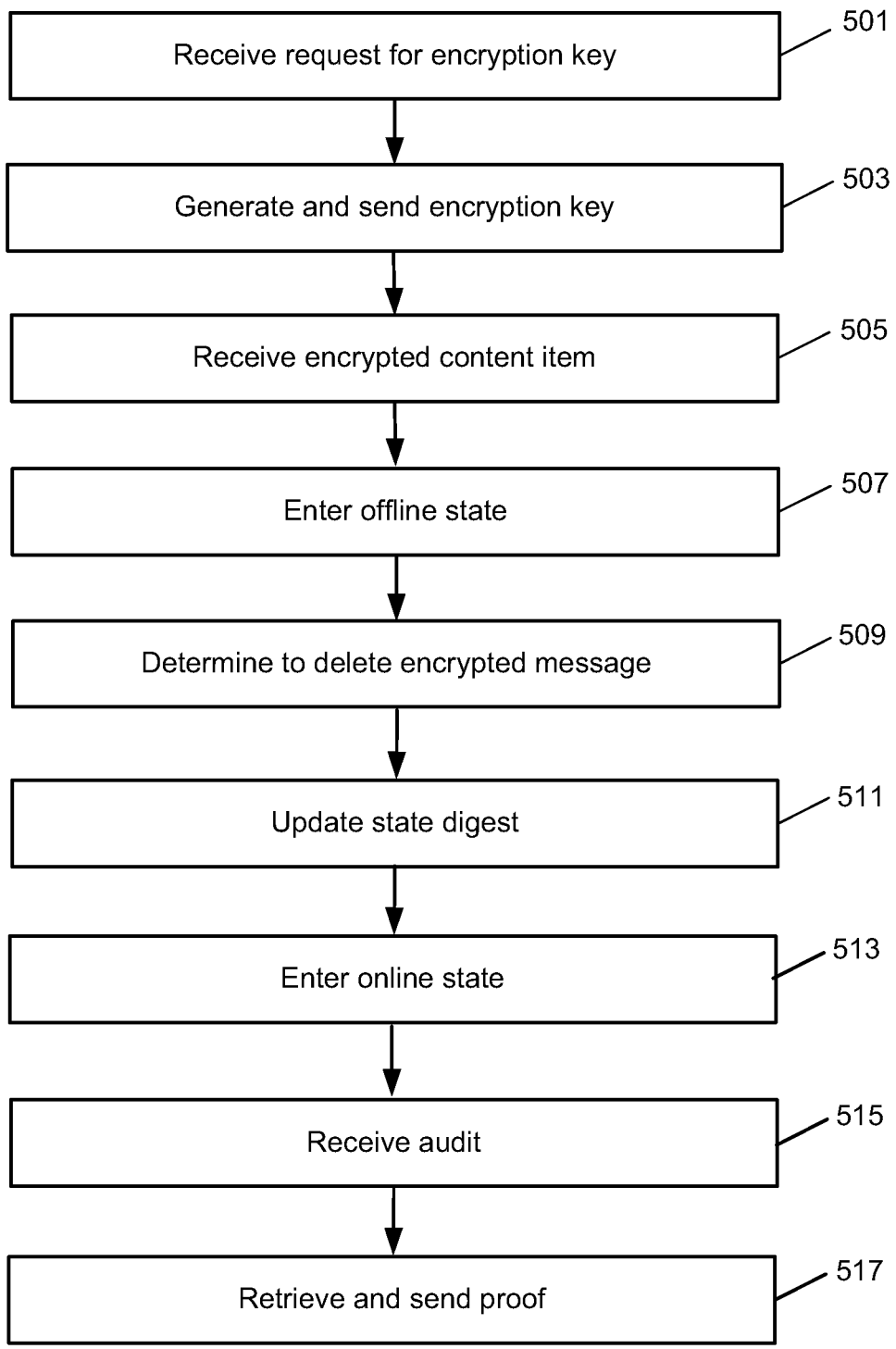
FIG. 5 is an operational flow of another implementation of a method for receiving a content item and responding to an audit.

FIG. 5 is an operational flow of an implementation of a method 500 for receiving a content item and responding to an audit. The method 500 may be implemented by the client device 110, for example.

A request for an encryption key is received at 501. The request may be received by a client device 110 from a content server 125 through the network 120. The request may include an identifier of a content item 130 that the content item server 125 intends to send to the client device 110. The content item 130 may have been initially requested by the client device 110 from the content item server 125.

An encryption key is generated and sent at 503. The encryption key 140 may be generated by a cryptographically-secure component 150 of the client device 110 and sent by the application 115 to the content item server 125 through the network 120.

An encrypted content item is received at 505. The encrypted content item 130 may be received by the application 115 of the client device 110 from the content item server 125 through the network 120. The content item 130 may have been encrypted by the content item server 125 using the encryption key 140.

An offline state is entered at 507. The client device 110 may go offline by disconnecting from the network 120 and/or the internet, for example.

A determination is made to revoke access to the content item at 509. The determination may be made by a user of the application 115 of the client device 110. For example, while the client device 110 is offline, the user may decide that they no longer want to watch the content item 130.

The state is updated at the 511. The state may be the state of the client device 110 and may be updated to reflect the revocation of access to the content item 130 by the cryptographically-secure component 150. In some implementations, the state may be updated using an extend operation by the cryptographically-secure component 150. In addition, the state may be appended to the log 215. Because the state is updated to a state that is not the state that the encryption key 140 was bound to by the cryptographically-secure component 150, the application 110 can no longer access the corresponding decryption key from the cryptographically-secure component 150. The content item 130 cannot be used or viewed without the decryption key.

An online state is entered at 513. The client device 110 may go online by reconnecting to the network 120 and/or the internet, for example.

An audit is received at 515. The audit 170 may be received by the application 115 of the client device 110 from the content item server 125. The content item server 125 may have sent the audit 170 when it detected that the client device 110 had returned online.

A proof is retrieved and sent at 517. The requested proof 160 may be sent by the application 115 of the client device 110 to the content item server 125 in response to the audit 170. The application 115 may retrieve the proof 160 from the cryptographically-secure component 150. In some implementations, the proof 160 may comprise a signed state digest, the log 215, and the signed contents of the SEM register 240. The content item server 125 may use the proof 160 to determine that the application 115 revoked access to the content item 130 while offline. Depending on the implementation, the content item sever 125 may refund the client device 110 a fee previously charged for the content item 130.

Figure 6:
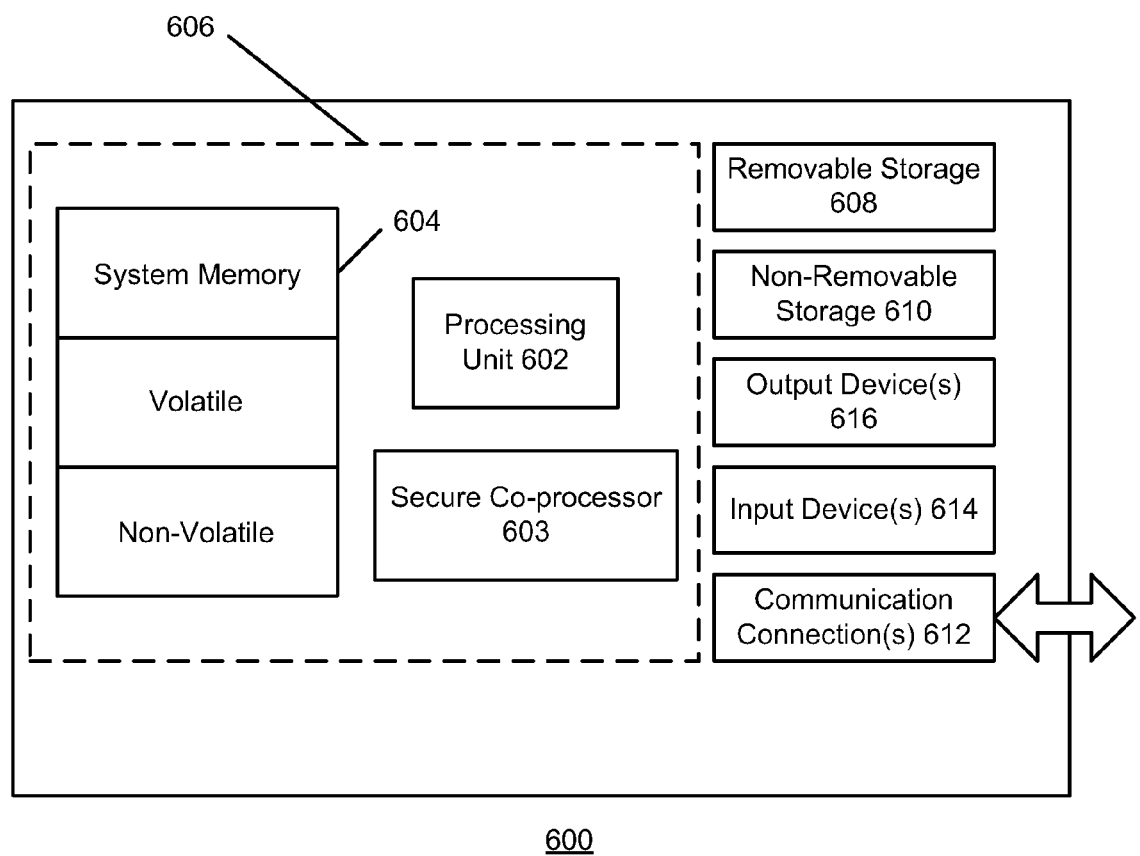
FIG. 6 is a block diagram of an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), smart phones, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610. The computing device 600 may further include a secure co-processor 603. The secure co-processor 603 may include a cryptographically-secure component similar to the cryptographically-secure component 150 illustrated in FIG. 2. The secure-coprocessor may 603 be a trusted platform module.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions)

embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a request for a content item at a content item server from a client device;
   sending a request for an encryption key from the content item server to the client device;
   receiving the encryption key by the content item server from the client device, wherein the encryption key is bound to a state associated with the client device accessing a decryption key corresponding to the encryption key, and wherein the encryption key was generated by the client device from a state digest of the client device and a certificate of the client device using a bind operation;
   verifying that the state that the encryption key is bound to is the state associated with the client device accessing the corresponding decryption key by the content item server; and
   if the state that the encryption key is bound to is the state associated with client device accessing the corresponding decryption key:
     encrypting the requested content item using the encryption key by the content item server; and
     sending the encrypted content item to the client device by the content item server.

2. The method of claim 1, further comprising:
   if the state that the encryption key is bound to is not the state associated with the client device accessing the corresponding decryption key, generating an error.

3. The method of claim 1, further comprising charging the client device an amount for the content item.

4. The method of claim 1, further comprising:
   requesting a proof that access to the content item was revoked by the client device; and
   receiving the proof that access to the content item was revoked, wherein the proof was generated by a cryptographically-secure component of the client device.

5. The method of claim 4, wherein the proof comprises a signed state digest and a log.

6. The method of claim 4, further comprising crediting the client device the amount for the content item in response to receiving the proof.

7. The method of claim 4, wherein the cryptographically-secure component comprises a trusted platform module.

8. The method of claim 1, wherein the encryption key is bound to the state without reference to a non-volatile counter.

9. A method comprising:
   requesting a content item by a client device from a content item server;
   receiving a request for an encryption key from the content item server by the client device;
   generating an encryption key from a state digest of the client device and a certificate of the client device using a bind operation, wherein the encryption key is generated by a cryptographically-secure component of the client device and is bound to a state associated with accessing a decryption key corresponding to the encryption key;
   sending the generated encryption key to the content item server by the client device; and
   receiving an encrypted content item by the client device from the content item server, wherein the encrypted content item was encrypted by the content item server using the encryption key.

10. The method of claim 9, further comprising:
    entering an offline state by the client device;
    determining to use the encrypted content item by the client device while in the offline state;
    in response to the determining, updating the state digest by the client device to the state associated with accessing the decryption key, wherein the state digest is stored in the cryptographically-secure component of the client device;
    appending the state associated with accessing the decryption key to a log;
    in response to the updating, receiving access to the decryption key by the client device from the cryptographically-secure component;
    decrypting the encrypted content item by the client device using the decryption key; and
    using the decrypted content item by the client device.

11. The method of claim 10, further comprising:
    entering an online state by the client device;
    in response to entering the online state, receiving an audit from the content item server by the client device;
    retrieving the state digest from the cryptographically-secure component by the client device; and
    sending the state digest and the log to the content item server by the client device in response to the audit.

12. The method of claim 11, further comprising receiving a charge for the content item from the content item server.

13. The method of claim 9, further comprising:
    entering an offline state by the client device;
    determining to revoke access to the encrypted content item by the client device;
    in response to the determining, updating the state digest by the client device to a state associated with revoking access, wherein the state digest is stored in the cryptographically-secure component of the client device; and
    appending the state associated with revoking access to a log.

14. The method of claim 13, further comprising:
    entering an online state by the client device;
    in response to entering the online state, receiving an audit from the content item server by the client device;
    retrieving the state digest from the cryptographically-secure component by the client device; and
    sending the state digest and the log to the content item server by the client device in response to the audit.

15. The method of claim 14, further comprising receiving a credit for the content item from the content item server.

16. The method of claim 9, wherein the cryptographically-secure component comprises a trusted platform module.

17. The method of claim 9, wherein the encryption key is bound to the state without reference to a non-volatile counter.

18. A system comprising:
a content item server adapted to provide an encrypted content item; and
at least one client device adapted to:
generate an encryption key from a state digest and a certificate using a bind operation;
receive the encrypted content item in an online state, wherein the encrypted content item is encrypted using the encryption key that is bound to a state associated with accessing a decryption key corresponding to the encryption key;
enter an offline state;
determine to use the encrypted content item while in the offline state;
update the state digest in a cryptographically-secure component to the state associated with accessing the decryption key;
receive access to the decryption key;
decrypt the encrypted content item using the decryption key; and
use the decrypted content item.

19. The system of claim 18, wherein the at least one client device is further adapted to:
enter an online state;
in response to entering the online state, receive an audit from the content item server;
retrieve the state digest from the cryptographically-secure component; and
send the state digest to the content item server in response to the audit.

20. The system of claim 18, wherein the encryption key is bound to the state without reference to a non-volatile counter.

* * * * *